United States Patent [19]

Morehouse et al.

[11] Patent Number: 5,218,253
[45] Date of Patent: Jun. 8, 1993

[54] SPIN MOTOR FOR A HARD DISK ASSEMBLY

[75] Inventors: James H. Morehouse, Jamestown; James A. Dunckley; David M. Furay, both of Boulder; Michael R. Utenick, Englewood, all of Colo.

[73] Assignee: Integral Peripherals, Inc., Boulder, Colo.

[21] Appl. No.: 630,110

[22] Filed: Dec. 19, 1990

[51] Int. Cl.⁵ .................................. H02K 11/00
[52] U.S. Cl. ........................ 310/68 R; 310/67 R; 310/156; 310/184; 310/198; 318/293
[58] Field of Search .......... 310/68 R, 154, 261, 310/67 R, 179, 180, 184, 208, 156, 268, 198, 254; 318/293, 254

[56] References Cited

U.S. PATENT DOCUMENTS

| | | | |
|---|---|---|---|
| 3,624,675 | 12/1971 | Porath | 318/254 |
| 3,670,189 | 6/1972 | Monroe | 310/156 UX |
| 3,984,873 | 10/1976 | Pejcha | |
| 4,371,903 | 2/1983 | Lewis | 360/75 |
| 4,492,903 | 1/1985 | Knight et al. | |
| 4,518,904 | 5/1985 | MacLeod et al. | |
| 4,535,374 | 8/1985 | Anderson et al. | |
| 4,536,691 | 8/1985 | Sakakibara | 318/254 UX |
| 4,568,988 | 2/1986 | McGinlay et al. | |
| 4,638,383 | 1/1987 | McGinlay et al. | |
| 4,748,385 | 5/1988 | Van Hout | 318/254 |
| 4,772,974 | 9/1988 | Moon et al. | |
| 4,794,293 | 12/1988 | Fujisaki | 310/268 |
| 4,831,469 | 5/1989 | Hanson | 318/254 |
| 4,876,491 | 10/1989 | Squires et al. | |
| 4,933,785 | 6/1990 | Morehouse et al. | |
| 4,968,911 | 11/1990 | Denk | 310/179 |
| 5,017,845 | 5/1991 | Carobolante | 318/254 |
| 5,023,527 | 6/1991 | Erdman | 318/254 |
| 5,030,864 | 7/1991 | Van Hout | 310/67 R |

OTHER PUBLICATIONS

"Quantum Low Power Products: Go Drive 2½-inch Hard Disk Drives-ProDrive Gem Series 3½-inch Small Frame Devices-Technical Highlights", Sep. 1990.

*Primary Examiner*—R. Skudy
*Attorney, Agent, or Firm*—Skjerven, Morrill, MacPherson, Franklin & Friel

[57] ABSTRACT

A spin motor assembly of a disk drive apparatus includes a stator having a plurality of wound coils associated therewith, and a rotor having a plurality of magnetic poles. Each winding structure of the stator is made up of two winding portions, with only one winding portion being used to drive the rotor relative to the stator upon drive current being applied to the winding structure, but with both winding portions being used to generate back electromotive force when drive current is cut off from the winding structure. This generated electromotive force is used to actuate an actuator motor to unload the read-write heads from the disk surface. As an alternative, each winding structure of the stator is made of a single winding, and the winding structures are used successively to drive the rotor relative to the stator, but with at least two winding portions generating back electromotive force when drive current is cut off.

15 Claims, 8 Drawing Sheets

UNI-POLAR / BI-POLAR SCHEMATIC

SPIN MOTOR FOR A HARD DISK ASSEMBLY

FIELD OF THE INVENTION

The present invention relates to a spin motor for a disk drive apparatus.

BACKGROUND OF THE INVENTION

It is well known to use the back electromotive force generated by a spin motor of a disk drive apparatus to unload the read/write heads thereof when the disk drive apparatus (including the spin motor) is being powered down. For example, this feature is discussed in U.S. Pat. No. 4,371,903 to Lewis, issued Feb. 1, 1983.

In such a typical case, the motor windings used for driving the spin motor when drive current is applied thereto are the same windings which generate the back electromotive force used for unloading upon power down. Typically, with lap top disk drives using five volt power supplies (versus 50 volts approximately 20 years ago or 12 volts approximately four years ago), peak unload voltage generated in such a system is limited by the normal run back electromotive force constant (typically 2.5 to 3 volts in the case of a five volt power supply).

It will readily be seen that an increase in the generated peak unload voltage in the above-described situation would be highly advantageous. However, it must be assured that appropriate voltage headroom requirements are maintained during running of the spin motor.

Of more general interest are U.S. Pat. No. 4,933,785 to Morehouse et al., issued Jun. 12, 1990; U.S. Pat. No. 4,535,374 to Anderson et al., issued Aug. 13, 1985; U.S. Pat. No. 4,568,988 to McGinlay et al., issued Feb. 4, 1986; U.S. Pat. No. 4,638,383 to McGinlay et al., issued Jan. 20, 1987; U.S. Pat. No. 4,518,904 to MacLeod et al., issued May 21, 1985; U.S. Pat. No. 3,984,873 to Pejcha, issued Oct. 5, 1976; and the publication "Quantum Low Power Products: Go Drive-2 ½-inch Hard Disk Drives- ProDrive Gem Series-3 ½-inch Small Frame Devices- -Technical Highlights", Sep. 1990.

SUMMARY OF THE INVENTION

The present invention is in a spin motor for a disk drive apparatus which includes a stator having a plurality of winding structures associated therewith and a rotor having a plurality of magnetic poles associated therewith. Each winding structure is made up of two portions, with only one portion of each winding structure being in use during normal running of the motor, but with both winding portions being used simultaneously during power down of the spin motor to generate back electromotive force to in turn operate an actuator motor used in unloading the heads from the disk.

In an alternative embodiment, the winding structures are used successively in driving the rotor relative to the stator when drive current is applied, but with at least a pair of the winding structures being used simultaneously to generate back electromotive force when drive current is cut off.

BRIEF DESCRIPTION OF THE DRAWINGS

FIGS. 3(A) through 3(D) are a series of enlargements of the area III—III of FIG. 1 as follows:

DESCRIPTION OF THE PREFERRED EMBODIMENTS

Referring to the drawings, the construction of the present spin motor 10 is shown in FIGS. 1-4. With initial reference particularly to FIGS. 1 and 4, the motor 10 includes a base plate 12 having a cylindrical portion 13 to which are fixed a plurality of annular laminations 14, 16, 18 of magnetically permeable material such as silicon steel, making up a plurality of teeth or cores (in this case nine radially spaced cores 20, 22, 24, 26, 28, 30, 32, 34, 36). Each core includes a respective copper winding structure 38, 40, 42, 44, 46, 48, 50, 52, 54 wound thereabout which will later be described in greater detail. The cores 20-36, winding structures 38-54, and base plate 12 make up the stator 56 of the motor 10.

Figure 1:
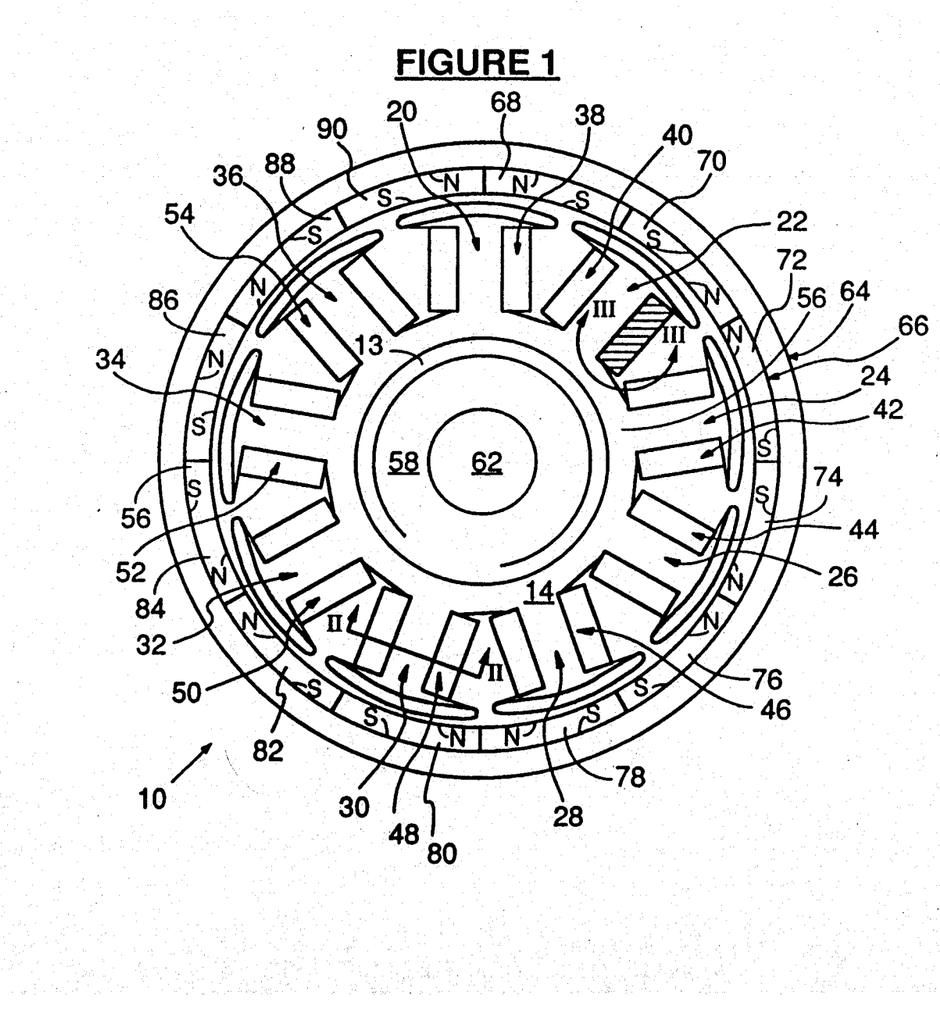
FIG. 1 is a top view showing the general implementation of the spin motor of the present invention.
Figure 4:
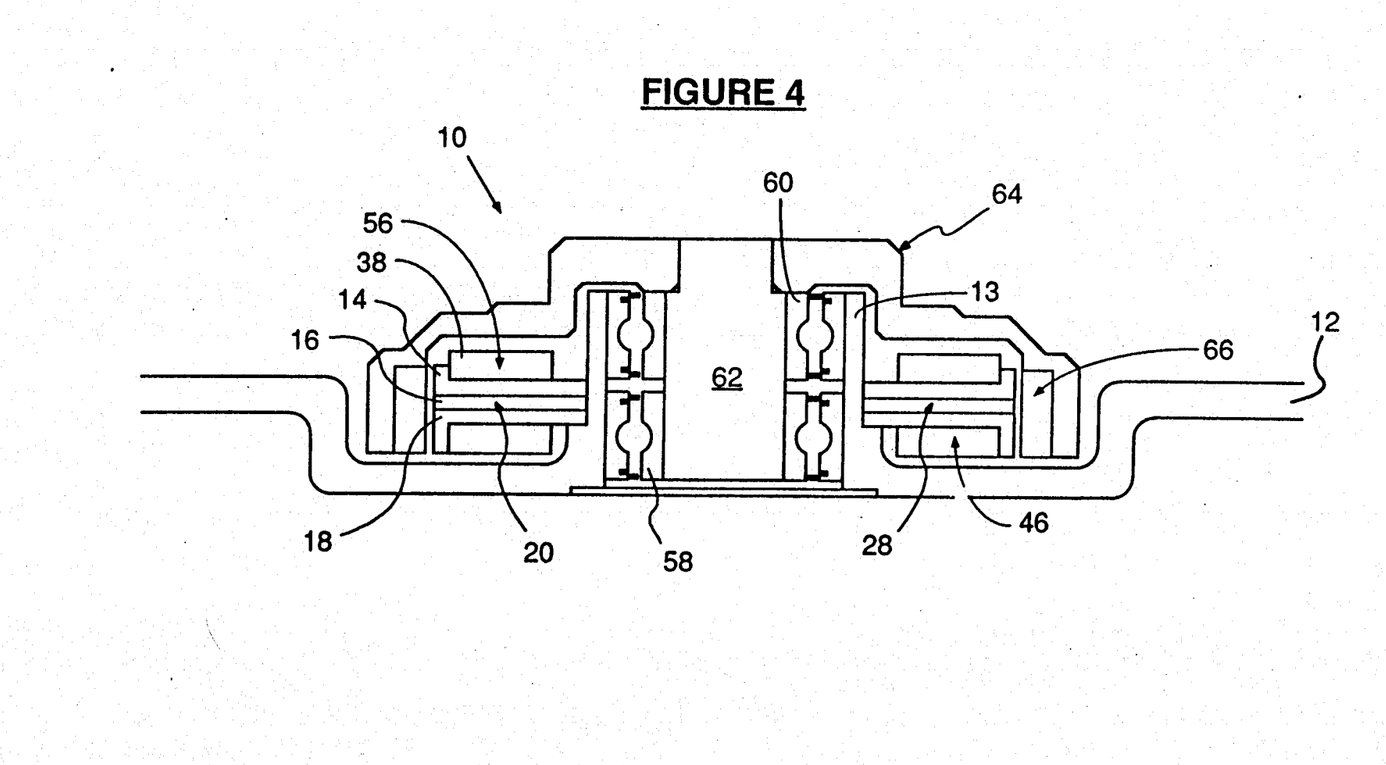
FIG. 4 is a sectional view of the motor of FIG. 1.

The cylindrical portion 13 of the base plate 12 has bearings 58, 60 mounted therewithin. Within the bearings 58, 60 is mounted shaft 62, so that the shaft 62 is rotatably mounted relative to the base plate 12. The shaft 62 has secured thereto a rotor 64 which includes a magnet ring 66 having 12 magnetic poles 68, 70, 72, 74, 76, 78, 80, 82, 84, 86, 88, 90.

Figure 2:
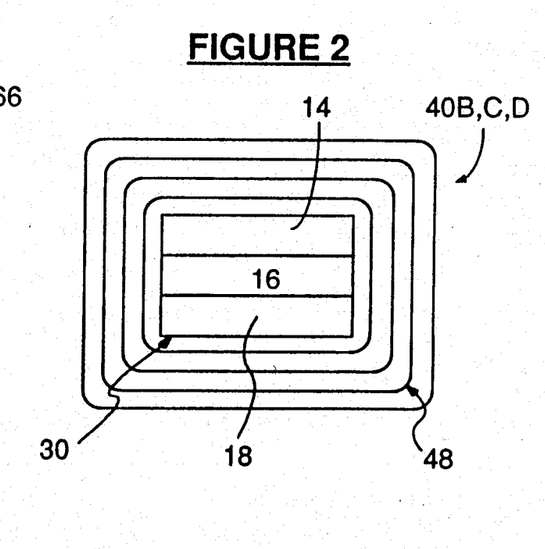
FIG. 2 is a sectional view taken along the line II—II of FIG. 1.
Figure 3A:
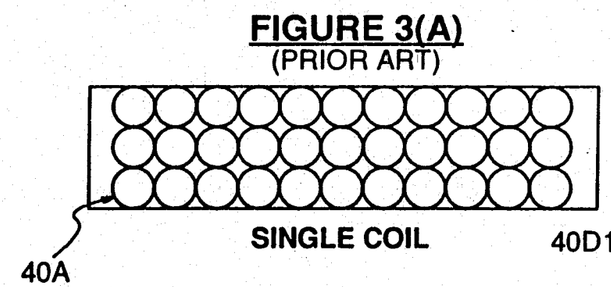
FIG. 3(A) is a sectional view of a prior art winding of a core, showing a single coil winding thereon.
Figure 3B:
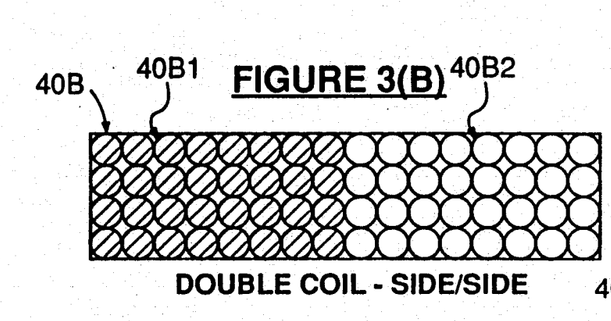
FIG. 3(B) is a sectional view of a first embodiment of winding structure of the present invention showing a double coil-side/side winding thereon.
Figure 3C:
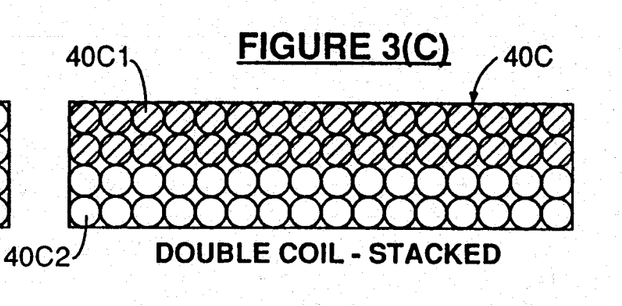
FIG. 3(C) is a sectional view of a second embodiment of winding structure of the present invention showing a double coil-stacked winding thereon.
Figure 3D:
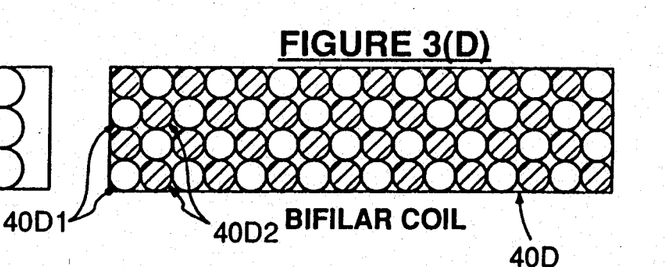
FIG. 3(D) is a sectional view of a third embodiment of winding structure of the present invention showing a bifilar coil winding thereon.

Reference is made to FIG. 3A to show a typical single coil winding structure 40A about a core 22 as is well known. In the present motor 10, in each embodiment thereof, however, each winding structure associated with a core is made up first and second winding portions (in the case of FIG. 3B, the winding portions 40B1, 40B2 of winding structure 40B being in side-by-side relation). In the case of FIG. 3C and in accordance with another embodiment of the present invention, one of the winding portions 40C1 of a winding structure 40C is wound or stacked over the other winding portion 40C2. In yet another embodiment of the present invention (FIG. 3D), the winding portions 40D1, 40D2 of winding structure 40D are wound in what is known as a bifilar manner, alternating in each horizontal and vertical row as shown. FIG. 2 is a sectional view of any of the winding structures as set up in FIGS. 3B through 3D, showing the winding structures in four layers.

Figure 5:
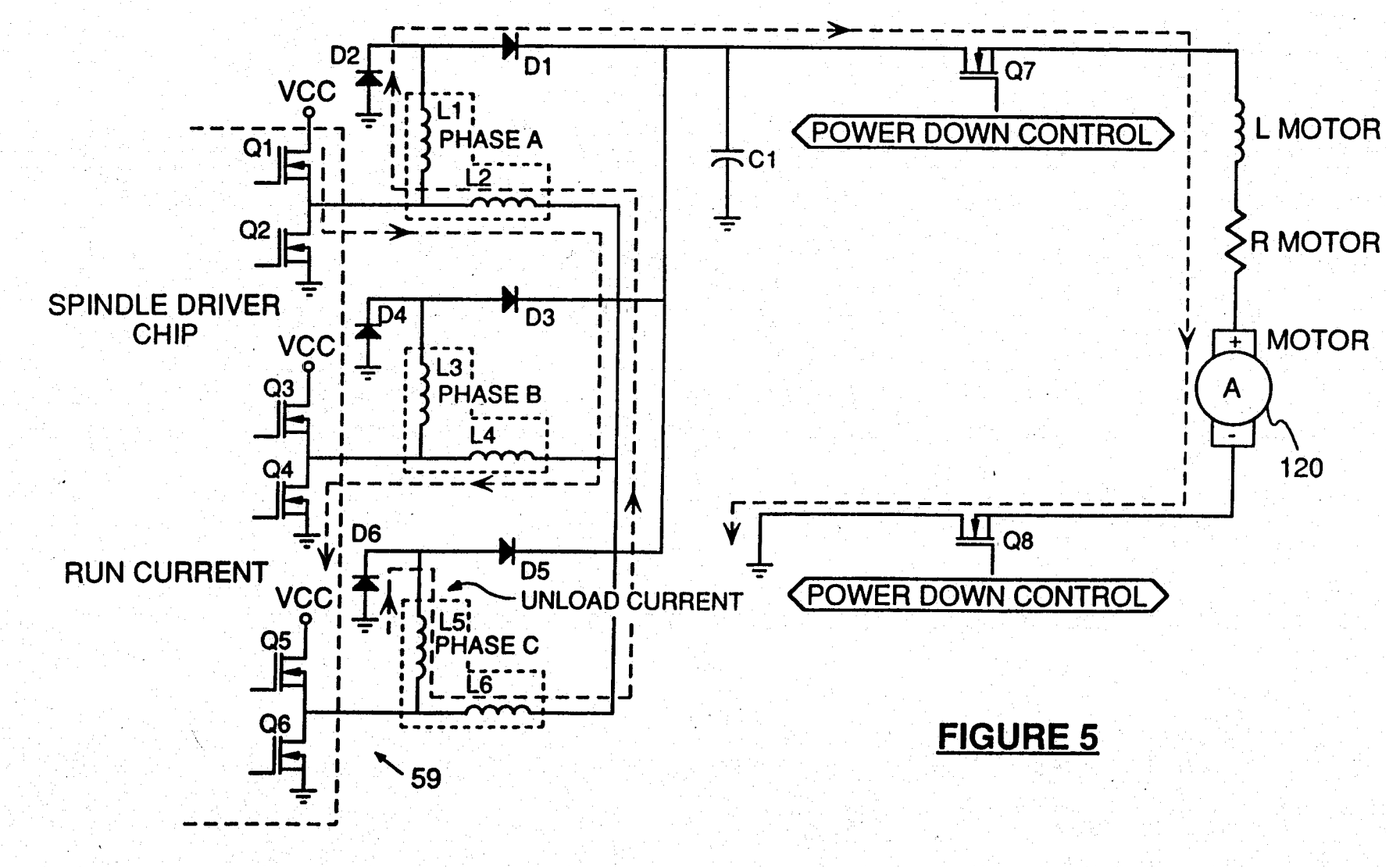
FIG. 5 is a schematic view of the circuitry of the present invention.

Reference is made to FIG. 5 to show the connections of the winding structures in the motor 10. The motor is a 3-phase motor, the phases being shown as phase A, phase B, and phase C. The connections are set up so that in the motor 10 of FIG. 1, the phase A windings include winding structures 38, 44, 50, each of which in turn includes respective first and second winding portions wound in accordance with FIGS. 3B, 3C or 3D. Likewise, phase B windings include the winding structures 40, 46, 52, each of which in turn includes respective first and second winding portions in accordance with FIGS. 3B, 3C and 3D, and phase C windings include the winding structures 42, 48, 54, each of which in turn includes respective first and second winding portions wound in accordance with FIGS. 3B, 3C or 3D.

Winding L1 of phase A represents the first winding portions of the winding structures of phase A, while winding L2 represents the second winding portions of the phase A windings. Similarly, winding L3 of FIG. 5 represents the first winding portions of the winding structures making up the phase B windings, while winding L4 represents the second winding portions of the winding structures making up phase B. Winding L5 represents the first winding portions making up the winding structures of phase B, while winding L6 represents the second winding portions making up the winding structures of phase C.

During normal run of the motor 10 to spin a disk connected to the rotor 64, the field effect transistors Q1, Q2, Q3, Q4, Q5 and Q6 operate in a sequence to cause the rotor 64 to spin relative to the stator 56.

During the first sequence, transistors Q1 and Q4 are on, while transistors Q2, Q3, Q5 and Q6 are off. Current flows from the voltage supply terminal $V_{CC}$ through transistor Q1, winding L2, winding L4, and transistor Q4 to ground.

During the second sequence, transistors Q1 and Q6 are on, while transistors Q2, Q3, Q4 and Q5 are off. In this situation, current flows from the voltage supply terminal $V_{CC}$ through transistor Q1, winding L2, winding L6, and transistor Q6 to ground.

During the third sequence, transistors Q3 and Q6 are on, while transistors Q1, Q2, Q4 and Q5 are off. Current flows from voltage supply terminal $V_{CC}$ through transistor Q3, winding L4, winding L6, and transistor Q6 to ground.

During the fourth sequence, transistors Q3 and Q2 are on, while transistors Q1, Q4, Q5 and Q6 are off. In this situation current flows from voltage supply $V_{CC}$ through transistor Q3, winding L4, winding L2, and transistor Q2 to ground.

During the fifth sequence, transistors Q5 and Q2 are on, while transistors Q1, Q3, Q4 and Q6 are off. Current flows from voltage supply $V_{CC}$ through transistor Q5, winding L6, winding L2 and transistor Q2 to ground.

In the sixth sequence, transistors Q5 and Q4 are on, while transistors Q1, Q2, Q3 and Q6 are off. Current flows from voltage supply terminal $V_{CC}$ through transistor Q5, winding L6, winding L4, and transistor Q4 to ground.

This sequence is of course repeated six times for each revolution of this rotor 56 in this embodiment.

It is to be noted that during this motor operation, only the windings L2, L4, L6 are used, i.e. the windings L1, L3, L5 are not used during normal running of the motor 10.

Figure 6:
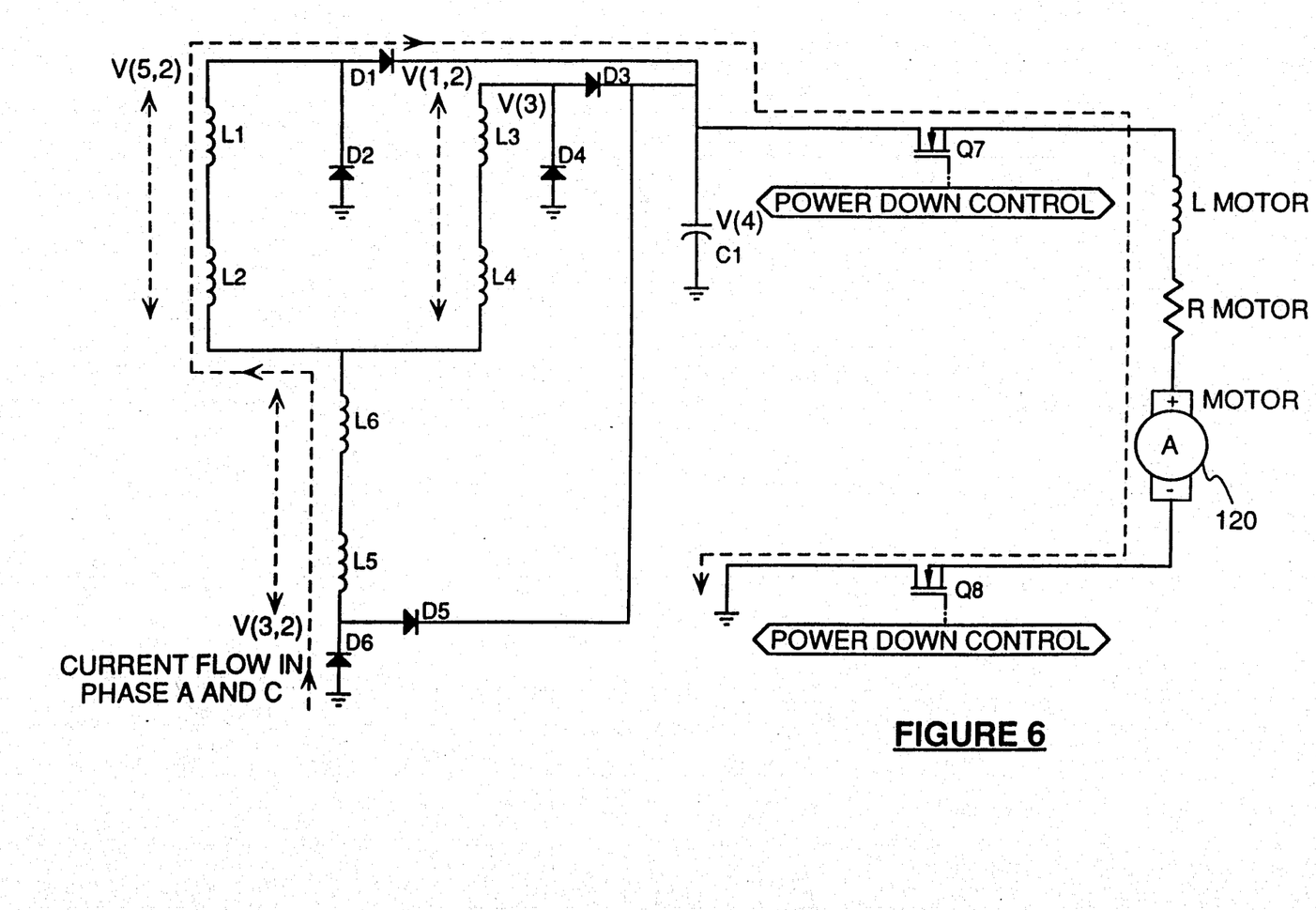
FIG. 6 is a schematic view of a portion of the circuitry of FIG. 5, excluding the spindle driver chip.

During the power down operation, the spindle driver chip 59 including the transistors Q1-Q6 is turned off and thus all electrical connection is removed from the spin motor 10. In this state, diodes D1, D2, D3, D4, D5 and D6 form a full wave rectifier bridge. In each phase of the motor 10, the windings together (i.e., L1, L2, L3, L4, L5, L6) simultaneously act as a single winding to generate back electromotive force. The circuit with the spindle driver chip 59 removed is shown in FIG. 6.

Figure 7:
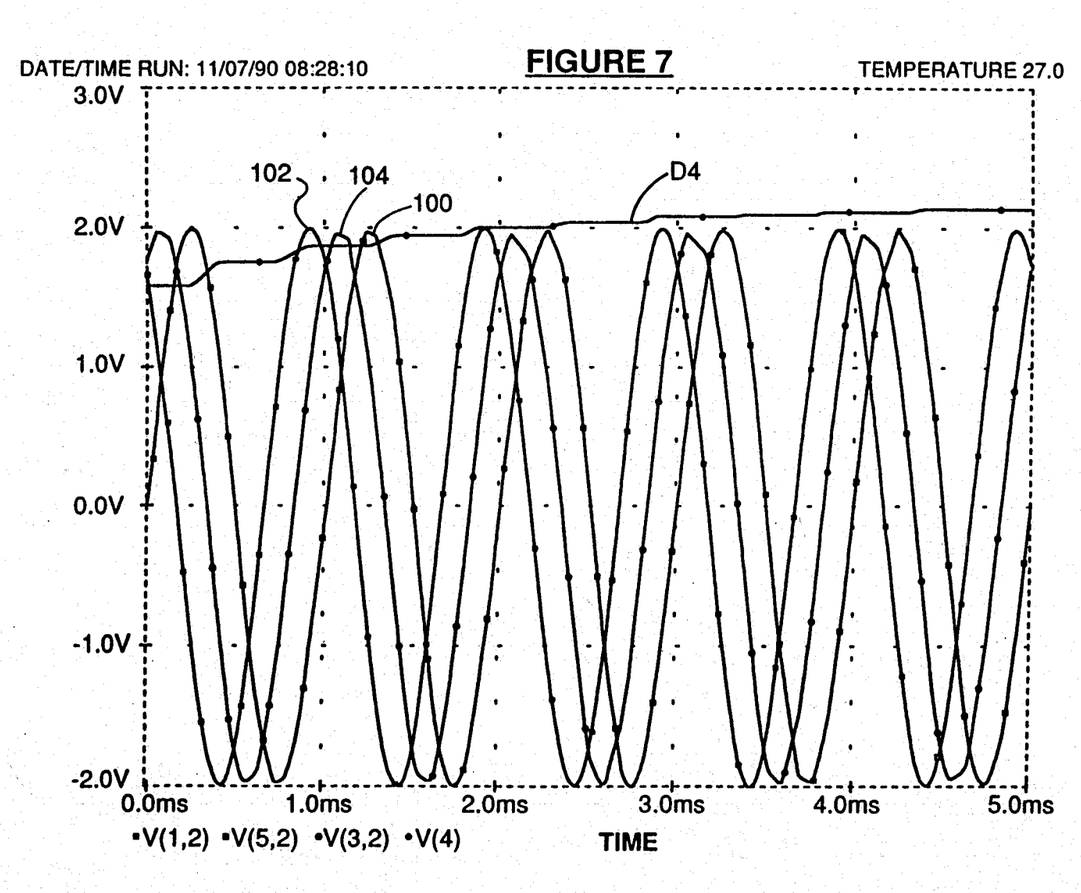
FIG. 7 is a graphical view of the waveform of the back electromotive force generated through use of the present spin motor.

FIG. 7 shows the waveforms of the back electromotive force generated by each phase over time as the motor 10 rotates during power down, with curve 100 being that generated by phase A, curve 102 being that generated by phase B, and curve 104 being generated by phase C. The voltage generated in the circuit in combination with the diodes D1-D6 and the capacitor C1 creates a DC voltage V4 across C1.

At this point, power down sense circuitry turns on transistors Q7 and Q8 so that the DC voltage from the capacitor is applied to the actuator motor 120, with the applied voltage, because of the windings utilized above, being sufficient to develop enough torque to rotate actuator motor 120 to cause the magnetic heads of the apparatus to be properly removed from a disk, as described generally in the above-cited U.S. Pat. No. 4,371,903.

In a typical circuit of this design, the voltage drops internal of the spin chip across the field effect transistors would vary with current, and would be approximately 0.5 ohms×current. The field effect transistor drops for those transistors outside the spindle driver chip 59 would be 0.1 ohms×current while typical diode drops would be 0.3 to 0.8 volts. Current at startup would be 0.4 to 1.2 amps, while current while running would be 0.05 to 0.2 amps (typically run current would be 0.08 amps).

Because only the windings L2, L4, L6 are used for normal running of the motor 10, the voltage headroom requirements are satisfied. As is well known, in order to drive a motor of this type the power supply voltage must be greater than the back electromotive force generated by the motor during running thereof plus the voltage drops generated by the motor resistance and the field effect transistors in the circuit (i.e., headroom requirement). When running the motor, the back electromotive force generated is that generated only by the windings L2, L4, L6 so that the voltage supply must only be greater than the back electromotive force generated by those windings plus the voltage drop generated by the motor resistance and the field effect transistors in the circuit to satisfy headroom requirements. However, with the windings L1-L6 being used for unloading purposes, approximately two times the back electromotive force would be generated as when the motor is being driven. The motor 10 resistance would approximately quadruple. However, since the spin motor 10 is only one element in the unload circuit, quadrupling the resistance thereof increases the loop resistance of the overall circuit by a small amount. At the same time, the voltage available for unloading after diode drops increases significantly, resulting in a significant increase in unload torque margin.

Figure 8:
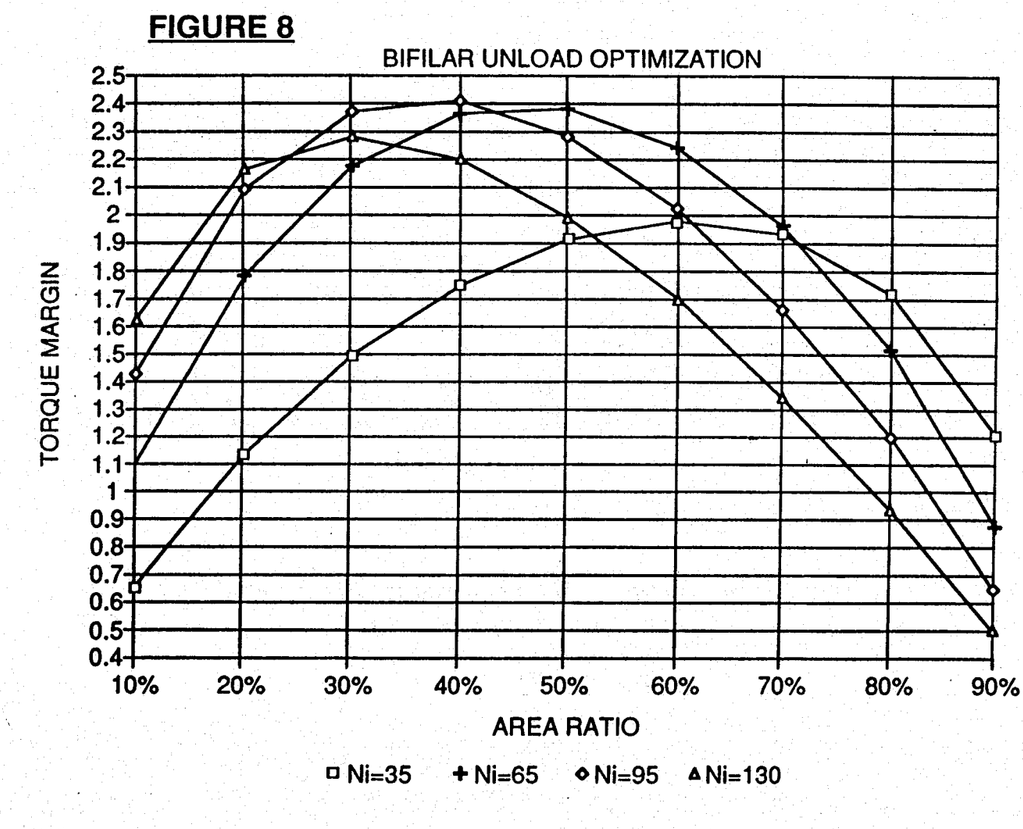
FIG. 8 is a graphical representation of torque margin of the present spin motor under unload conditions for different area ratios and for different numbers of secondary coil winding turns used in the motor.

Reference is made to FIG. 8 in regard to various constructions of the first and second winding portions with respect to unload torque margins. This analysis is based on each first winding portion (i.e., that winding portion used in driving the motor) having 65 turns (to satisfy the voltage overhead requirements of the spin control circuit as described above). Also, the same winding structure total cross-sectional area (including both the first and second winding portions thereof) is always used.

The computations for FIG. 8 proceed as follows:

An area ratio is assumed, i.e., for example, 30%. This means 30% of the cross-sectional area of a winding structure of the type, for example, in FIG. 3B is provided by the 65 turns of the first winding portion, while 70% of the cross-sectional area of the winding structure is provided by the second winding portion thereof;

2. The resistance of the first winding portion is calculated;

3. The number of turns $N_1$ for the second winding portion is chosen (for example, $N_1 = 35$ turns);

4. The resistance of the second winding portion is calculated;

5. The back electromotive force of the second winding portion is calculated (back electromotive force of the first winding portion is constant);

6. The unload current is calculated from the circuit equation;

7. The unload torque is calculated from the unload current; and

8. Torque margin = torque available divided by torque required for unloading.

In the example chosen, the torque margin $M_T$ equals 1.5 (i.e., area ratio equals 30% and $N_1$ equals 35).

Figure 9:
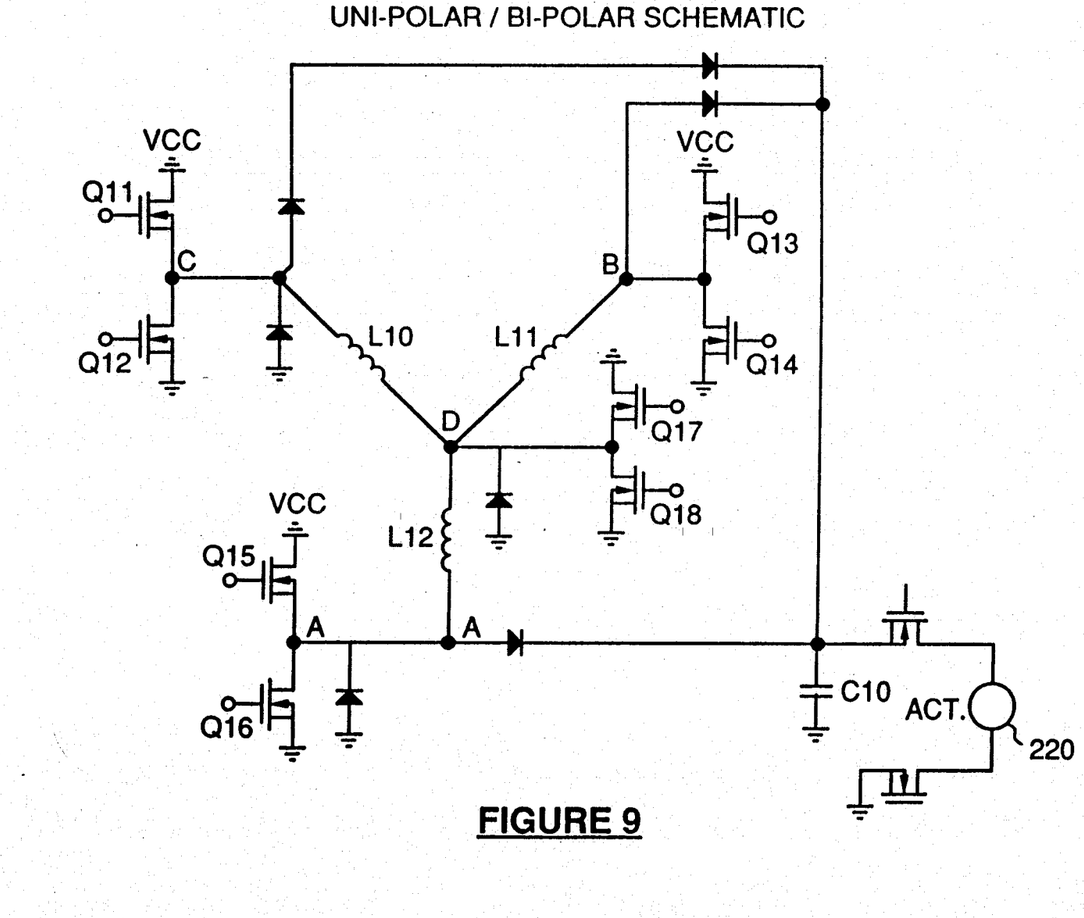
FIG. 9 is a schematic view of the circuitry of an alternative embodiment of the invention.

FIG. 9 shows another embodiment of the invention based in principles similar to that previously described.

Bifilar winding structures of the type described have historically been used for high torque, low speed operation (both winding portions) and low torque, high speed operation (only one portion of each winding structure being used). Furthermore, similar configurations have been used in the case where both winding portions are used for startup of a motor while the single winding portions are used for normal run of the motor. However, these applications are quite different from the present wherein both winding portions are used to generate higher back electromotive force to be employed for unloading purposes, while only one winding portion of each winding is used for normal drive of the motor 10.

In this embodiment, a three-phase motor includes three winding structures L10, L11, L12 each taking the form of a single winding, the windings L10, L11, L12 being connected at a common point or center tap D. During the normal run of the motor the schematic of which is shown in FIG. 9, the field effect transistors Q11, Q12, Q13, Q14, Q15, Q16, along with the additional field effect transistors Q17, Q18 operate to cause the rotor thereof to spin relative to the stator.

During the first sequence, transistors Q11 and Q18 are on, while all other transistors are off. Current flows from the voltage supply terminal through transistor Q11, through winding L10, through center tap D, and through transistor Q18.

During the second sequence, transistors Q13 and Q18 are on, while all other transistors are off. In this situation, current flows from the voltage supply terminal VCC through transistor Q13, through winding L11, through center tap D and through transistor Q18 to ground.

During the third sequence, transistors Q15 and Q18 are on, while all other transistors are off. In this situation, current flows from voltage supply terminal VCC through transistor Q15, winding L12, center tap D and transistor Q18.

During the fourth sequence, transistors Q17 and Q12 are one, while all other transistors are off. In this situation, current flows from VCC through transistor Q17, center top D, winding L10, and transistor Q12.

During the fifth sequence, transistors Q17 and Q14 are on, while all other transistors are off. In this situation, current flows from VCC through transistor Q17, center top D, winding L11, and transistor Q14.

During the sixth sequence, transistors Q17 and Q16 are on, while all other transistors are off. In this situation, current flows from VCC through transistor Q17, center top D, winding L12, and transistor Q16. This sequence is but one of many that could be used to spin the motor.

During the power down operation, all of the transistors Q11-Q16 are turned off and thus all electrical connection is removed from the motor. Additionally, the transistors Q17 and Q18 are off. In this situation, the windings L10, L11, L12 act simultaneously together to generate back electromotive force which is applied to the capacitor C10, with the DC voltage thereof again being applied to the actuator motor 220 as previously described.

We claim:

1. A drive apparatus comprising:
   a motor having a stator and a rotor, one of said stator and rotor having a plurality of magnetic poles and the other of said stator and rotor having at least one winding structure, the winding structure comprising a first winding portion and a second winding portion;
   means for providing that only the first winding portion of said winding structure is used in driving the rotor relative to the stator when drive current is applied to said winding structure; and
   means for providing that both the first and second winding portions of said winding structure are simultaneously used to generate back electromotive force when drive current is cut off from the winding structure.

2. The apparatus of claim 1 wherein the first and second winding portions are in side-by-side relation.

3. The apparatus of claim 1 wherein one of the winding portions is wound over an other winding portion.

4. The apparatus of claim 1 wherein the first and second winding portions are bifilar.

5. The apparatus of claim 1 and further comprising actuator means, and means for applying the generated back electromotive force, generated by the first and second winding portions of said winding structure, to said actuator means.

6. The apparatus of claim 5 wherein the actuator means comprise an actuator motor.

7. A drive apparatus comprising:
   a motor having a stator and a rotor, one of said stator and rotor having a plurality of magnetic poles and the other of said stator and rotor having a plurality of winding structures, each winding structure wound about a respective associated core, each winding structure comprising a first winding portion and a second winding portion;
   means for providing that only the first winding portion of each winding structure is used in driving the rotor relative to the stator when drive current is applied to that winding structure; and means for providing that both the first and second winding portions of each winding structure are simultaneously used to generate back electromotive force when drive current is cut off from that winding structure.

8. The apparatus of claim 7 wherein the first and second winding portions are wound in side-by-side relation about said associated core.

9. The apparatus of claim 7 wherein one of the winding portions is wound about an other winding portion, which is in turn wound about said associated core.

10. The apparatus of claim 7 wherein the first and second winding portions are bifilar.

11. The apparatus of claim 7 and further comprising an actuator motor, and means for applying the back electromotive force generated by each of the winding structures to said actuator motor.

12. The apparatus of claim 7 wherein the stator has said plurality of winding structures, and the rotor has said plurality of magnetic poles.

13. The apparatus of claim 7 wherein said motor is a 12-pole, 3-phase motor.

14. A drive apparatus comprising:
   a motor having a stator and a rotor, one of said stator and rotor having a plurality of magnetic poles and an other of said stator and rotor having a plurality of winding structures;
   means for providing that the winding structures are used successively in driving the rotor relative to the stator when drive current is applied to chosen winding structures; and
   means for providing that at least a pair of winding structures are simultaneously used to generate back electromotive force when drive current is cut off from the winding structures.

15. The apparatus of claim 14 wherein said drive apparatus is a three-phase motor, and wherein each winding structure is a phase winding of said motor.

* * * * *